(12) United States Patent
Bakke et al.

(10) Patent No.: US 7,139,907 B2
(45) Date of Patent: Nov. 21, 2006

(54) METHOD AND APPARATUS FOR IMPLEMENTING DISTRIBUTED SCSI DEVICES USING ENHANCED ADAPTER RESERVATIONS

(75) Inventors: Brian Eric Bakke, Rochester, MN (US); Brian James King, Rochester, MN (US); Timothy Jerry Schimke, Stewartville, MN (US); Rick Alan Weckwerth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 10/835,455

(22) Filed: Apr. 29, 2004

(65) Prior Publication Data

US 2005/0246516 A1    Nov. 3, 2005

(51) Int. Cl.
*G06F 15/177* (2006.01)
*G06F 9/24* (2006.01)
*G06F 9/00* (2006.01)

(52) U.S. Cl. .............................. 713/1; 713/2; 713/100

(58) Field of Classification Search ................. None
See application file for complete search history.

(56) References Cited

U.S. PATENT DOCUMENTS

| 6,182,167 B1 * | 1/2001 | Basham et al. ............... 710/38 |
| 6,247,099 B1 * | 6/2001 | Skazinski et al. ............ 711/141 |
| 7,080,196 B1 * | 7/2006 | Kitamura .................... 711/114 |

* cited by examiner

*Primary Examiner*—James K. Trujillo
*Assistant Examiner*—Stefan Stoynov
(74) *Attorney, Agent, or Firm*—Joan Pennington

(57) ABSTRACT

A method and apparatus are provided for implementing distributed (SCSI) devices using enhanced adapter reservations. A plurality of adapters is provided. Each adapter implements a plurality of logical devices with each logical device respectively coupled to a port of the distributed SCSI devices. The adapters manage reservations for the plurality of logical devices selectively using a no reservation state, an implicit reservation state, and an explicit reservation state. The adapters arbitrarily assign one adapter for managing each of the plurality of logical devices.

19 Claims, 10 Drawing Sheets

_US 7,139,907 B2_

METHOD AND APPARATUS FOR IMPLEMENTING DISTRIBUTED SCSI DEVICES USING ENHANCED ADAPTER RESERVATIONS

FIELD OF THE INVENTION

The present invention relates generally to the data processing field, and more particularly, relates to a method and apparatus for implementing distributed small computer systems interface (SCSI) devices using enhanced adapter reservations.

DESCRIPTION OF THE RELATED ART

A need exists for an effective mechanism for controlling access to a set of disk resources, which are accessible via multiple storage adapters. Typically redundant adapters are required to meet reliability and availability requirements.

However, it is difficult for multiple storage adapters to have concurrent access to the disks in the presence of advance functions such as RAID or write cache because of the difficulties in coordinating operation and recovery. Host systems are not used to the requirement to perform assignment of the disk resource to an adapter before usage. It is also desirable to allow usage without requiring explicit assignment, for example in a boot driver, which is difficult to change.

Prior solutions have typically had either a requirement on the host system software to perform configuration and assignment of the disk resources to a given adapter, or have had a much more complicated implementation which tightly coupled the two adapters together at the expense of complexity and reduced performance.

SUMMARY OF THE INVENTION

Principal aspects of the present invention are to provide a method and apparatus for implementing distributed (SCSI) devices using enhanced adapter reservations. Other important aspects of the present invention are to provide such method and apparatus for implementing distributed (SCSI) devices using enhanced adapter reservations substantially without negative effect and that overcome many of the disadvantages of prior art arrangements.

In brief, a method and apparatus are provided for implementing distributed (SCSI) devices using enhanced adapter reservations. A plurality of adapter is provided. Each adapter implements a plurality of logical devices with each logical device respectively coupled to a port of the distributed SCSI devices. The adapters manage reservations for the plurality of logical devices selectively using a no reservation state, an implicit reservation state, and an explicit reservation state. The adapters assign one adapter for managing each of the plurality of logical devices.

In accordance with features of the invention, the adapters arbitrarily assign the resources to one of the adapters in the absence of a host reservation. For example, the adapter that accesses a resource first gains access to the resource and is given an implicit reservation. When an adapter has an implicit reservation, other adapters are blocked from using the resource and operations fail with a conventional reservation conflict response. A host device driver is able to move resources between adapters using predefined SCSI reservation management commands.

In accordance with features of the invention, the adapters provide redundancy such that the resources can still be accessed even in the event of hardware failure. The adapters are decoupled and are allowed to independently power up and power down.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment, a method is provided that presents the appearance of a single physical device even though the device is actually a distributed, loosely coupled, logical SCSI device. Presenting the appearance of a single physical device allows the existing host device driver model to be preserved without requiring the host device driver to change. To manage the assignment of resources the SCSI Reserve, Release, and Reset functions are used.

Figure 1:
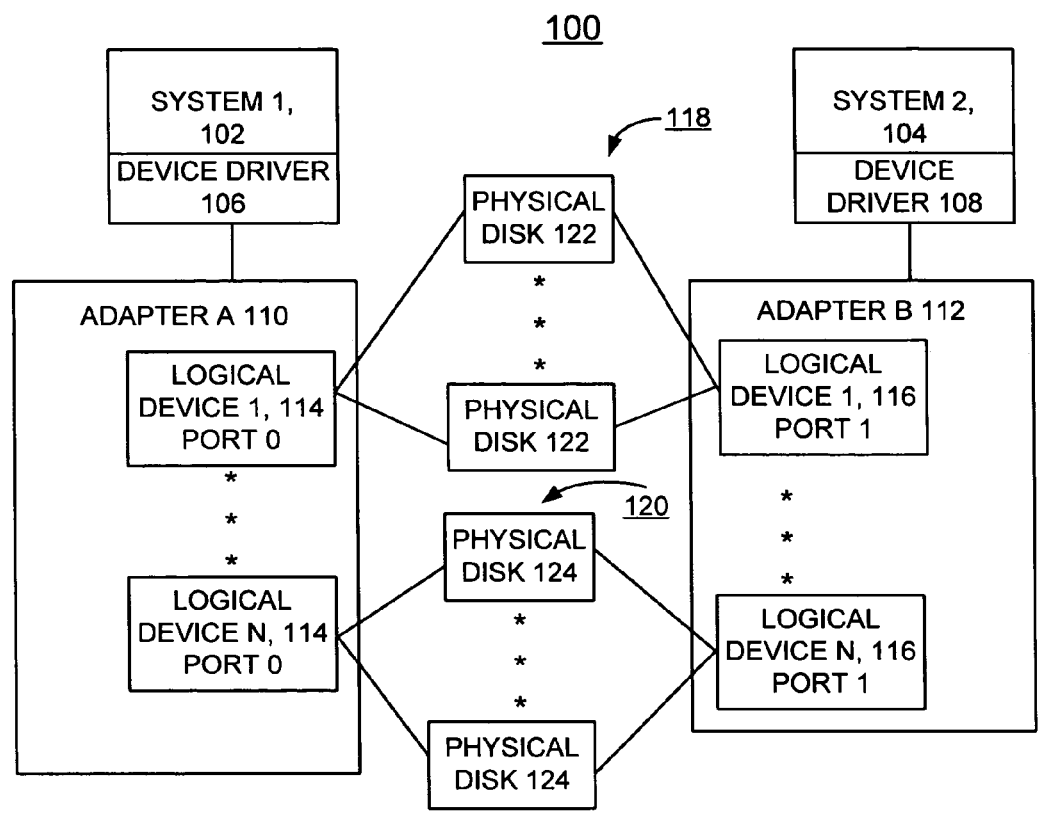
FIG. 1 is a block diagram of an exemplary multiple adapter apparatus for implementing distributed (SCSI) devices using enhanced adapter reservations in accordance with the preferred embodiment.

Referring now to the drawings, in FIG. 1 there is shown an exemplary multiple adapter apparatus generally designated by the reference character 100 for implementing distributed (SCSI) devices using enhanced adapter reservations in accordance with the preferred embodiment. Apparatus 100 includes a first system 1, 102 and a second system 2, 104 respectively coupled by a device driver 106, 108 to a pair of adapters 110, 112. The adapters A 110, and B 112 of apparatus 100 are arranged in accordance with the preferred embodiment. Adapter A 110 implements a plurality of logical devices 1-N, 114, port 0. Adapter B 112 implements a plurality of logical devices 1-N, 116, port 1. A first redundant array of independent disks (RAID) storage device array 118 is coupled to the logical device 1, 114, port 0 of adapter A 110 and to the logical device 1, 116, port 1 of adapter B 112. A second RAID storage device array 120 is coupled to the logical device N, 114, port 0 and to the logical device N, 116, port 1. As shown, each RAID storage device array 118, 120 respectively includes a plurality of physical disks 122, 124. It should be understood that the present invention is not limited to physical SCSI devices, the present invention can be used with various other implementations, for example, serial attached SCSI (SAS) devices, serial ATA devices, and fiber channel arbitrated loop (FCAL) devices.

It should be understood that the present invention is not limited to the illustrated arrangement of multiple adapter apparatus 100. For example, it should be understood that both of the adapters 110, 112 could be attached to the same system, such as the first system 1, 102. While two adapters 110, 112 are shown in FIG. 1, it should be understood that present invention can be used with various hardware implementations and systems, for example, with various numbers of adapters 1-N.

In accordance with features of the preferred embodiment, the enhanced adapter reservation simplifies management and implementation. The invention introduces a concept called an implicit reservation. Each host system 102, 104 sees a traditional reservation mode, but each of adapters 110, 112 use implicit and explicit reservations and eliminates the need for special software to configure and manage control of the RAID array 118, 120. Auto-configuration on first touch is used to determine which adapter 110, 112 will be responsible for managing the RAID array and this simplifies host setup and configuration.

In accordance with features of the preferred embodiment, all key functions are done by a single one of the adapters 110, 112 because all disk resources are assigned to a single adapter 110, or 112. In the absence of a host reservation, the adapters 110, 112 arbitrarily assign the resources to one of the adapters 110, 112. This adapter 110, or 112 then puts in place a phantom or implicit reservation and other adapters 110, or 112 are blocked from using these resources and operations fail with a conventional reservation conflict response. The host device drivers 106, 108 are able to move resources between adapters 110, 112 via the usage of the standard SCSI reservation management commands. The adapters 110, 112 are decoupled and are allowed to independently power up and power down as needed.

Each of multiple adapters 110, 112 logically corresponds to a SCSI port. Each adapter 110, 112 also contains all of the capability needed to access the resources. These multiple adapters 110, 112 then provide redundancy such that the resources can still be accessed even in the event of hardware failure. It is required in many applications to have a single adapter control the resources, for example, to manage the RAID function across a set of SCSI disks. SCSI architecture provides Reserve and Release commands to gain exclusive access and this exclusive access is described here as an Explicit Reservation. A command sent to a resource which another entity has already reserved will fail with a reservation conflict response.

In accordance with features of the preferred embodiment, in the absence of reservations, whichever adapter A 110 or adapter B 112 accesses the resource first gains access to the resource and is given an implicit reservation. If the other adapter attempts a media request, for example, a read or write request, the request is failed with a reservation conflict response even though there is not actually a SCSI reservation outstanding. If the wrong adapter end up holding an implicit reservation a LUN Reset command is used to transfer the implicit reservation to the other adapter. The host system 102 or 104 knows to do this because the response received is reservation conflict. This is the same exact mechanism used to break explicit reservations, and the existing architecture implementation of host systems 102, 104 and device drivers 106, 108 advantageously is preserved.

In accordance with features of the preferred embodiment, adapters 110, 112 implement respective logical devices 114, 116, without common shared memory, and may be packaged separately with separate power boundaries and the like. The necessary configuration and state information is stored on the physical disks themselves.

The device 120 can function even if only one of the ports is working. The only unique aspect is that user data sometimes is present only in the port (in the cache of the adapter), however, this is handled transparently to the host system wherever possible.

From an implementation perspective, the reservations are maintained and managed by the adapters 110, 112. There is metadata stored in configuration sectors on the device. This metadata is read at IPL, and as needed after that to determine the current reservation state. Reservations at the individual device level are not used, i.e. no Reserve/Release commands sent on SCSI bus to the physical device.

Usually the reservations are managed and transferred cooperatively between adapters 110, 112 via adapter-to-adapter communication. As part of this process the configuration sectors on the device 120 are updated as needed. If an adapter 110 is missing or failed, the remaining adapter 112 is able to preemptively change the state by modifying the configuration sectors. If the failed adapter reappears, it will see the updated state on the configuration sector even if the other adapter is now missing.

The commands used to manage reservations on the array are the same as those used to manage a single device while the commands target a logical unit numbers (LUNs) instead of devices with each array 118, 120 exposed as a unique LUN instead of a unique target device. The commands are:

Reserve—establish an exclusive reservation by this host,

Release—release any reservations held by this host, and

LUN Reset—clears all reservations from all hosts.

From the host perspective the array is either reserved or not reserved. For management of the arrays, the adapter 110, 112 has three possible states for each array 118, 120 including.

Explicit Reservation—equivalent to an outstanding reserve to the array from the host;

Implicit Reservation—No outstanding host reservation. However, one host does have an outstanding open. The adapter 110 or 112 with the implicit reservation manages the array. The other adapter 110 or 112 will return reservation conflict; and No Reservation—No outstanding host reservation, and no host currently using the array. One adapter 110 or 112 is currently managing the array.

The host establishes an explicit reservation by sending a SCSI reserve command to the array. Reservations are released in the following cases:

1. A SCSI release command is sent to the same adapter holding the reservation.

2. A LUN reset command is sent to the adapter holding the reservation.

3. A LUN reset command is sent to the other adapter, i.e. the adapter not holding the reservation. The LUN reset command always breaks the reservation.

4. At initial program load (IPL) time if the adapter holding the reservation is not present. Note that removing the reservation in this case does not affect cache coherency. Information related to cache coherency is separate from information related to reservations. This results in the following possibilities.

a. The array might have no data in cache. In this case the array can be accessed immediately.

b. The array might have mirrored cache data in this adapter because this adapter used to be paired with the previous reservation holder. In this case the array can be accessed immediately, and the adapter will use the mirrored cache data.

c. The array might have data in cache, but no adapter present has this data. The array is read/write protected because of the cache problem, and media commands will be failed not because of a reservation conflict, because of the cache problem.

5. When the system holding the reservation is powered down. The reservation is cleared only after all media access to the device have completed and future media access commands would be rejected.

Note that an adapter 110 or 112 going away or getting reset does not alter the reservation state. If one of two adapters 110 or 112 goes away, the remaining adapter will not automatically break the reservation. This requires an external stimulus, such as the LUN Reset command, to do so. From a modeling perspective this is like one port of a dual port device failing and does not affect the reservations of the logical device.

The following TABLE 1 describes what happens at IPL if both adapters 110, 112 IPL at the same time.

TABLE 1

IPL Reservation States

| Initial State (prior to IPL) | Ending State (after IPL) |
| --- | --- |
| No Reservation, managed by any adapter | No Reservation, managed by adapter A (determination of A or B is arbitrary, and determined in predefined way) |
| Implicit Reservation, managed by adapter A | No Reservation, managed by adapter A |
| Implicit Reservation, managed by adapter B | No Reservation, managed by adapter B |
| Implicit Reservation, managed by different adapter | No Reservation, managed by adapter A (determination of A or B is arbitrary, and determined in predefined way) |
| Explicit Reservation, managed by adapter A | Explicit Reservation, adapter A (Reservation not broken) |
| Explicit Reservation, managed by adapter B | Explicit Reservation, adapter B (Reservation not broken) |
| Explicit Reservation, managed by different adapter | No Reservation, managed by adapter A (Reservation broken. Determination of A or B is arbitrary) |

The following TABLE 2 describes what happens when a request to Open an array is received by adapter A. Note that the Open is always successful.

TABLE 2

Open Request

| Initial State (prior to Open) | Ending State (after Open) |
| --- | --- |
| No Reservation, managed by adapter A | Implicit Reservation, managed by adapter A |
| No Reservation, managed by adapter B | Implicit Reservation, managed by adapter A |
| Implicit Reservation, managed by adapter B | Implicit Reservation, managed by adapter B |
| Explicit Reservation, managed by adapter A | Explicit Reservation, managed by adapter A |
| Explicit Reservation, managed by adapter B | Explicit Reservation, managed by adapter B (Reservation not broken) |

The following TABLE 3 describes what happens when a media access command and a bring up command is received by adapter A. In order to receive these commands, the adapter must have been previously opened, so there is not a "No Reservation" condition.

TABLE 3

Read/Write commands and Bring up commands

| Reservation State (before command) | Command Outcome | Reservation State (after command) |
| --- | --- | --- |
| Implicit Reservation, managed by adapter A | Command executes successfully | Implicit Reservation, managed by adapter A |
| Implicit Reservation, managed by adapter B | Command fails, reservation conflict response | Implicit Reservation, managed by adapter B |
| Explicit Reservation, managed by adapter A | Command executes successfully | Explicit Reservation, managed by adapter A |
| Explicit Reservation, managed by adapter B | Command fails, reservation conflict response | Explicit Reservation, managed by adapter B |

Figure 2:
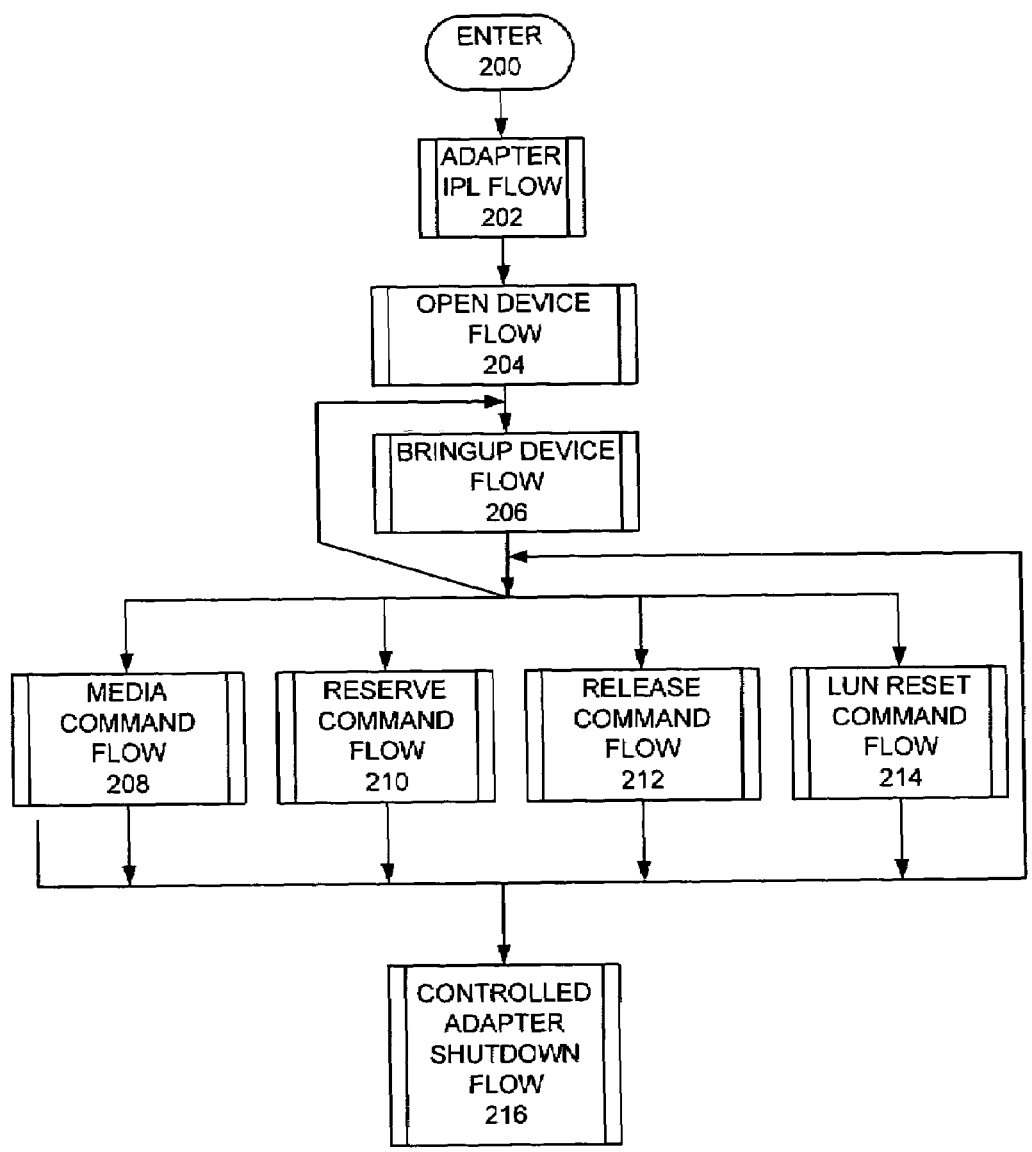
FIGS. 2, 3, 4, 5, 6, 7, 8, 9, and 10 are flow charts illustrating exemplary steps for implementing distributed (SCSI) devices using enhanced adapter reservations in accordance with the preferred embodiment.

Referring now to FIG. 2, there are shown exemplary steps of an overall flow for implementing distributed (SCSI) devices using enhanced adapter reservations in accordance with the preferred embodiment starting at a block 200. A plurality of flows are embedded within the overall flow including an adapter IPL flow as indicated in a block 202 illustrated and described with respect to FIG. 3, an open device flow as indicated in a block 204 illustrated and described with respect to FIG. 4, and a bring up device flow as indicated in a block 206 illustrated and described with respect to FIG. 5. Following the bring up device flow at block 206, a plurality of flows include a media command flow 208 illustrated and described with respect to FIG. 6, a reserve command flow 210 illustrated and described with respect to FIG. 7, a release command flow 212 illustrated and described with respect to FIG. 8, and a LUN reset command flow 214 illustrated and described with respect to FIG. 9. The cycles in the overall flow represent one or more bring up commands processed at block 206 followed by a sequence of the media, reserve, release and LUN reset commands in any order. Finally a controlled adapter shutdown flow 216 illustrated and described with respect to FIG. 10 is performed for a controlled shutdown situation.

Figure 3:
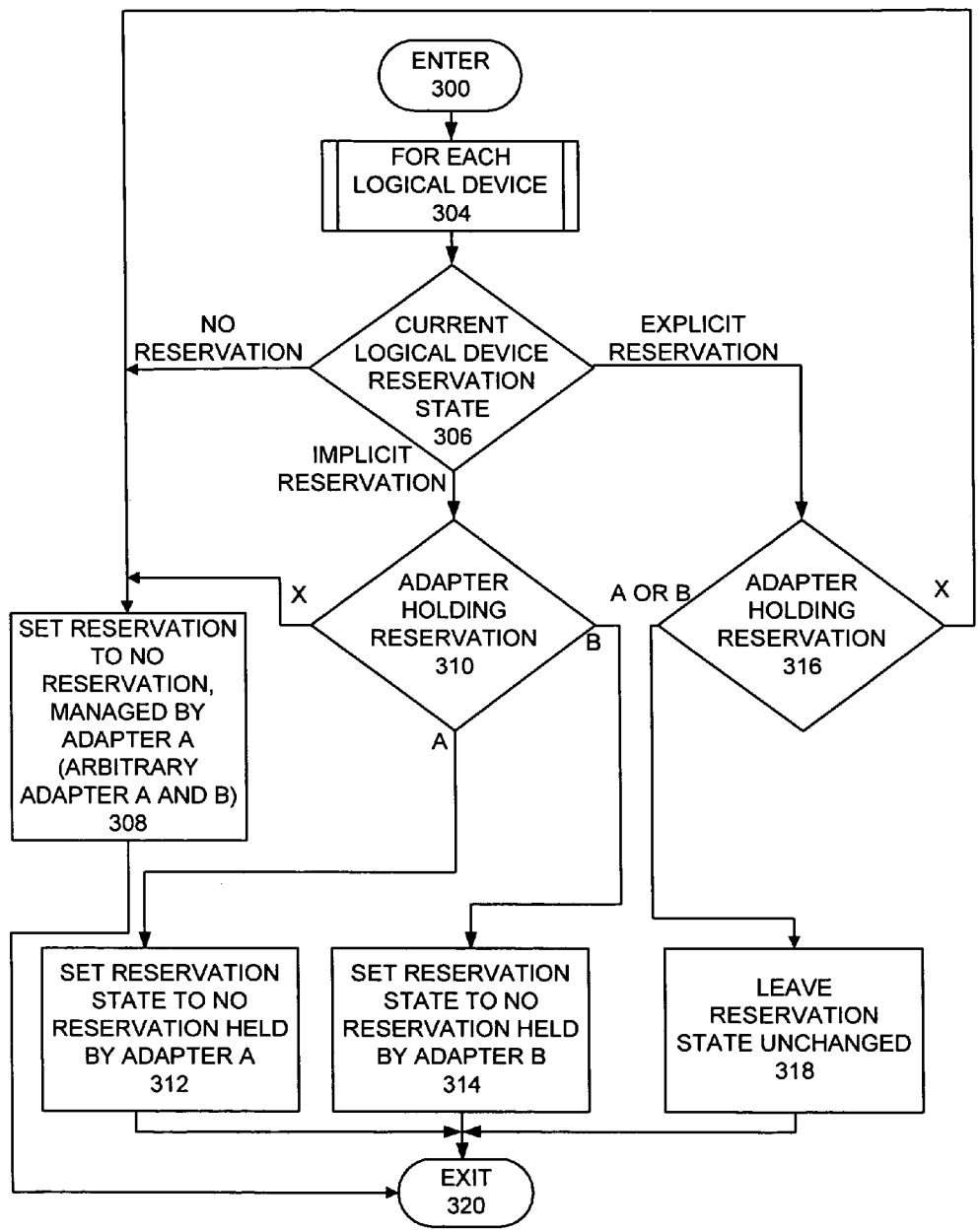

Referring now to FIG. 3, there are shown exemplary steps of an adapter IPL flow shown at block 202 of FIG. 2 starting at a block 300. For each logical device as indicated in a block 304, a current logical device reservation state is identified as indicated in a decision block 306. When a no reservation state is identified, the reservation for the current logical device is set to no reservation, and managed by adapter A as indicated in a block 308. At block 308, it should be understood that assignment is arbitrary between currently present adapters A or B.

When an implicit reservation state is identified, then checking for the adapter holding the reservation is performed as indicated in a decision block 310. When adapter X, an adapter that is not current present, is identified as holding the implicit reservation, then the reservation for the current logical device is set to no reservation, and managed by adapter A at block 308. Adapter X would have been present at some time in the past, its existence is inferred because of the reservation state information for the logical device that is contained within its associated physical devices.

When adapter A is identified as holding the implicit reservation, then the reservation for the current logical device is set to no reservation, and held by adapter A as indicated in a block 312. When adapter B is identified as holding the implicit reservation, then the reservation for the current logical device is set to no reservation, and held by adapter B as indicated in a block 314. When an explicit reservation state is identified, then checking for the adapter holding the reservation is performed as indicated in a decision block 316. When adapter X is holding the explicit reservation, then the reservation for the current logical device is set to no reservation, and managed by adapter A at block 308. When adapter A or B is holding the explicit reservation, then the reservation state is left unchanged as indicated in a block 318. Then the exemplary steps exit as indicated in a block 320.

Figure 4:
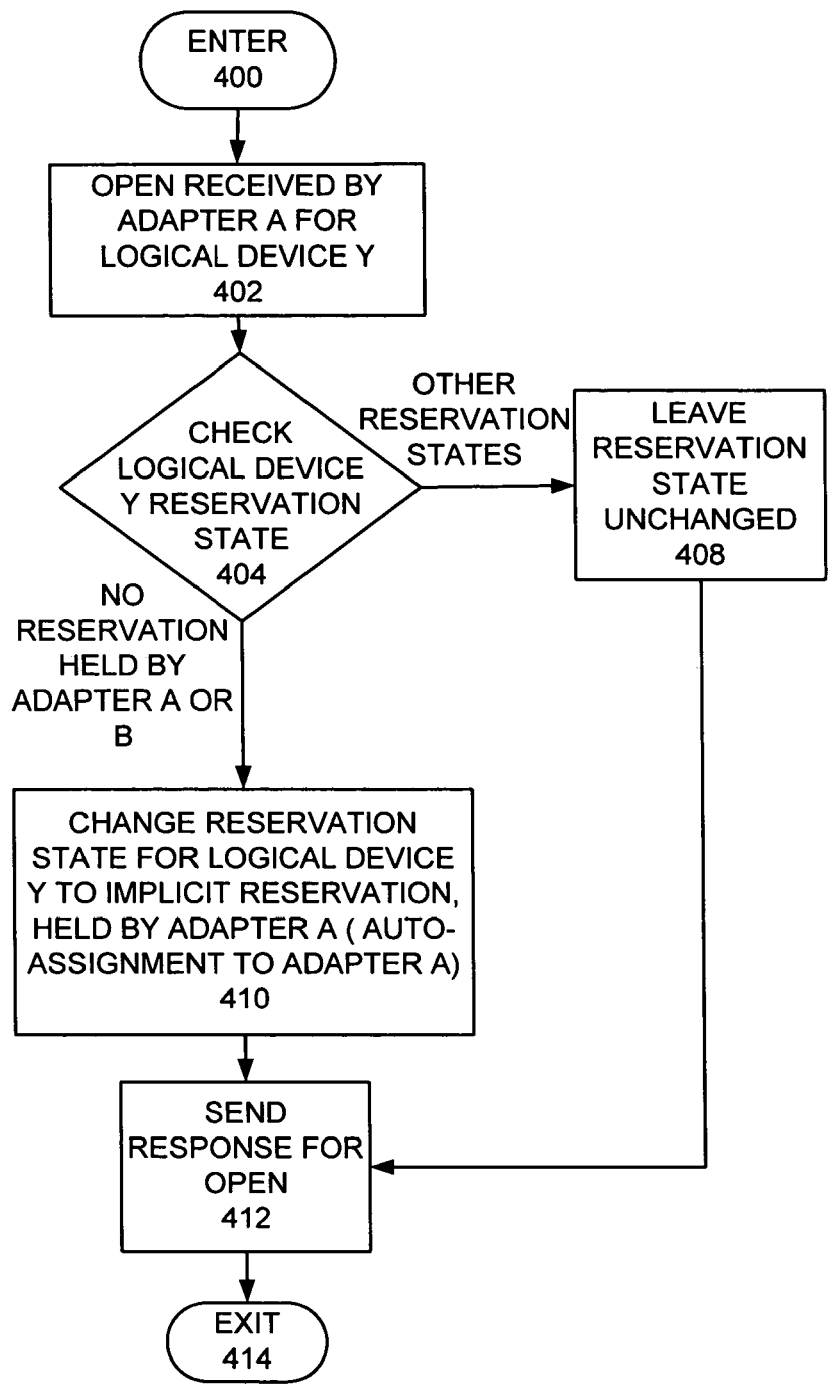

Referring now to FIG. 4, there are shown exemplary steps of an open device flow shown at block 204 of FIG. 2 starting at a block 400. As indicated in a block 402, an open request is received by adapter A for a logical device Y. Responsive to the open request, checking the reservation state for logical device Y is performed as indicated in a decision block 404. If any reservation state, implicit reservation or explicit reservation, for logical device Y is identified, then the reservation state is left unchanged as indicated in a block 408. If no reservation state for logical device Y is identified, then the reservation state for logical device Y is changed to an implicit reservation managed by adapter A as indicated in a block 410 with the auto-assignment to adapter A. It should be understood that the determination of A or B for the auto-assignment is arbitrary, and is determined in predefined way. A response is sent for the open request as indicated in a block 412. Then the exemplary steps exit as indicated in a block 414.

Figure 5:
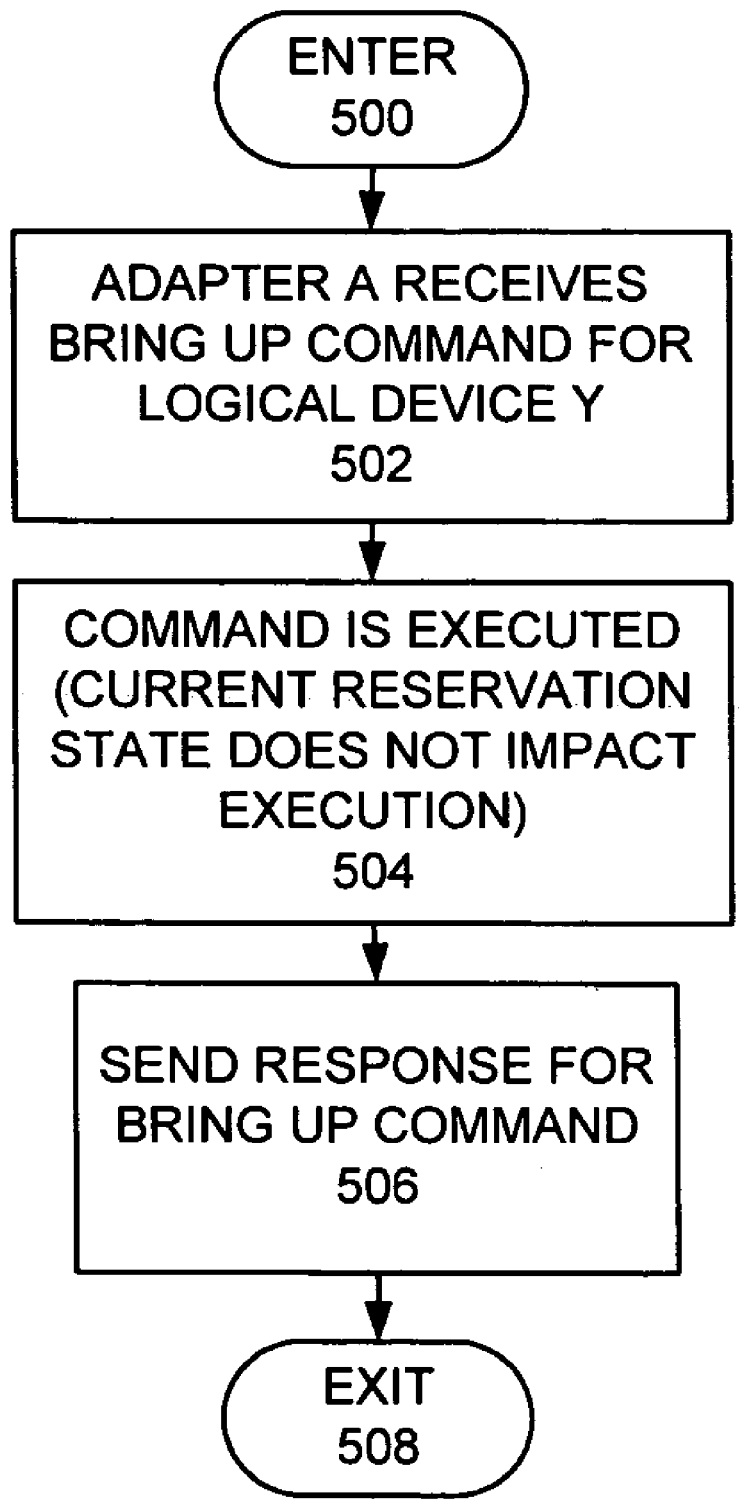

Referring now to FIG. 5, there are shown exemplary steps of a bring up device flow shown at block 206 of FIG. 2 starting at a block 500. Examples of Bring up commands are: Inquiry, Test Unit Ready, Request Sense, Read Capacity, and Start Unit. As indicated in a block 502, a bring up command is received by adapter A for a logical device Y. The bring up command is executed as indicated in a block 504. The current reservation state does not impact the command execution. A response is sent for the bring up command as indicated in a block 506. Then the exemplary steps exit as indicated in a block 508.

Figure 6:
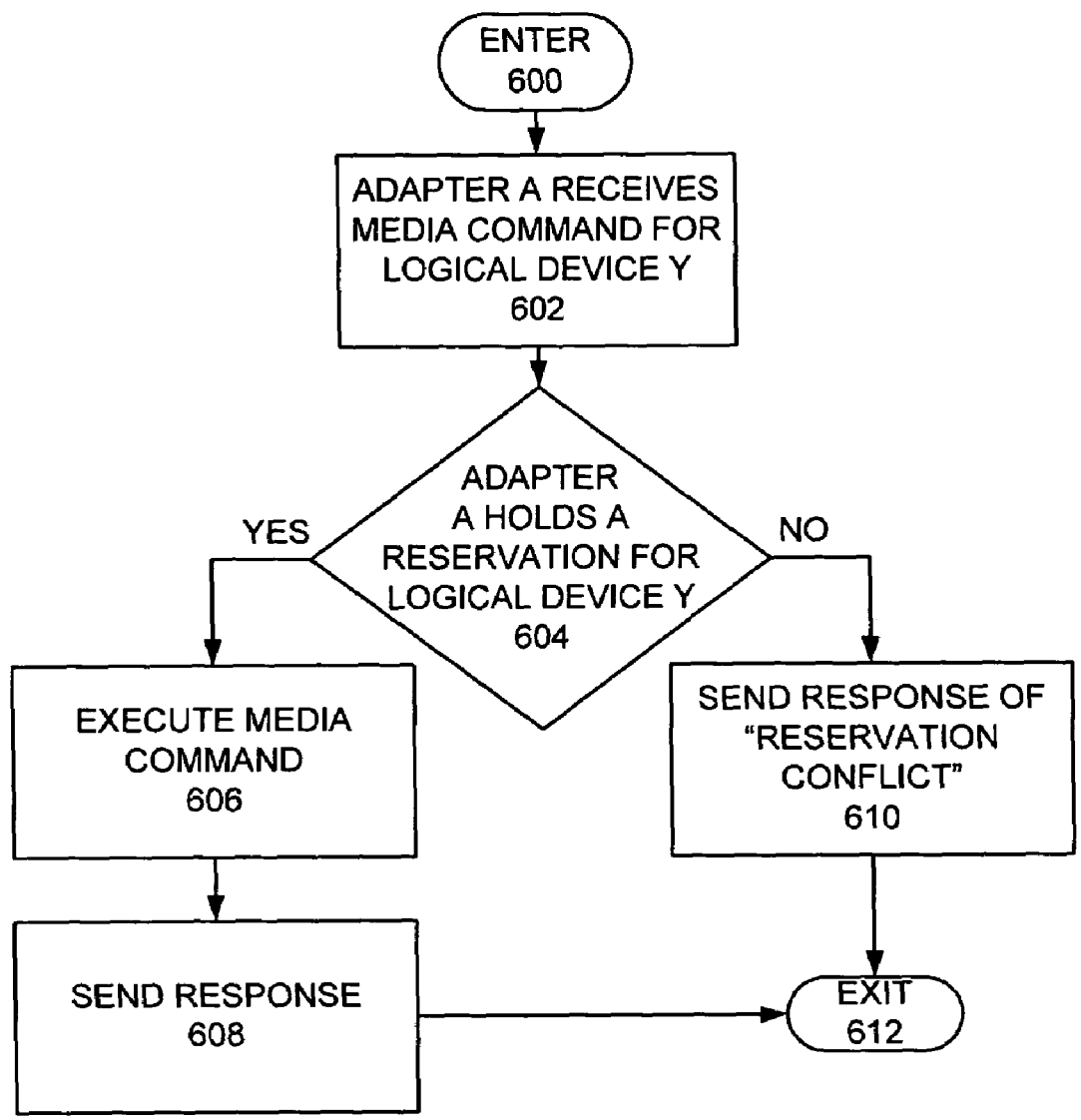

Referring now to FIG. 6, there are shown exemplary steps of a media command flow shown at block 208 of FIG. 2 starting at a block 600. As indicated in a block 602, a media command is received by adapter A for a logical device Y. Checking whether adapter A holds a reservation for logical device Y is performed as indicated in a decision block 604. If adapter A holds a reservation for logical device Y, then the media command is executed as indicated in a block 606. A response is sent for the media command as indicated in a block 608. Otherwise if adapter A does not hold a reservation for logical device Y, then a reservation conflict response is sent as indicated in a block 610. The exemplary steps exit as indicated in a block 612.

Figure 7:
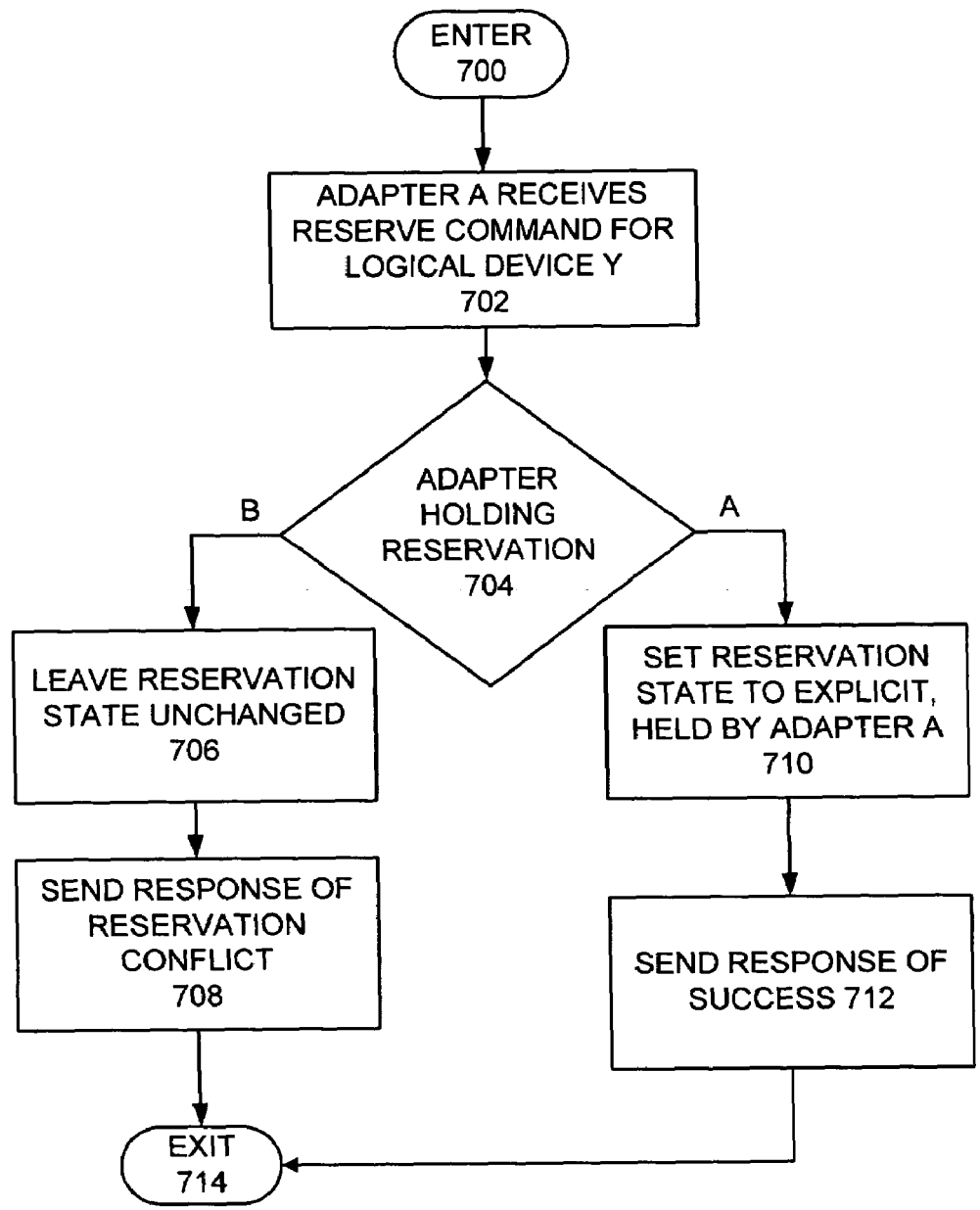

Referring now to FIG. 7, there are shown exemplary steps of a reserve command flow shown at block 210 of FIG. 2 starting at a block 700. As indicated in a block 702, a reserve command is received by adapter A for a logical device Y. Checking whether adapter A or adapter B holds a reservation for logical device Y is performed as indicated in a decision block 704. When adapter B holds the reservation for logical device Y, then the reservation state is left unchanged as indicated in a block 706 and a response of a reservation conflict is sent as indicated in a block 708. When adapter A holds the reservation for logical device Y, then the reservation state is set to explicit as indicated in a block 710 and a response of success is sent as indicated in a block 712. The exemplary steps exit as indicated in a block 714.

Figure 8:
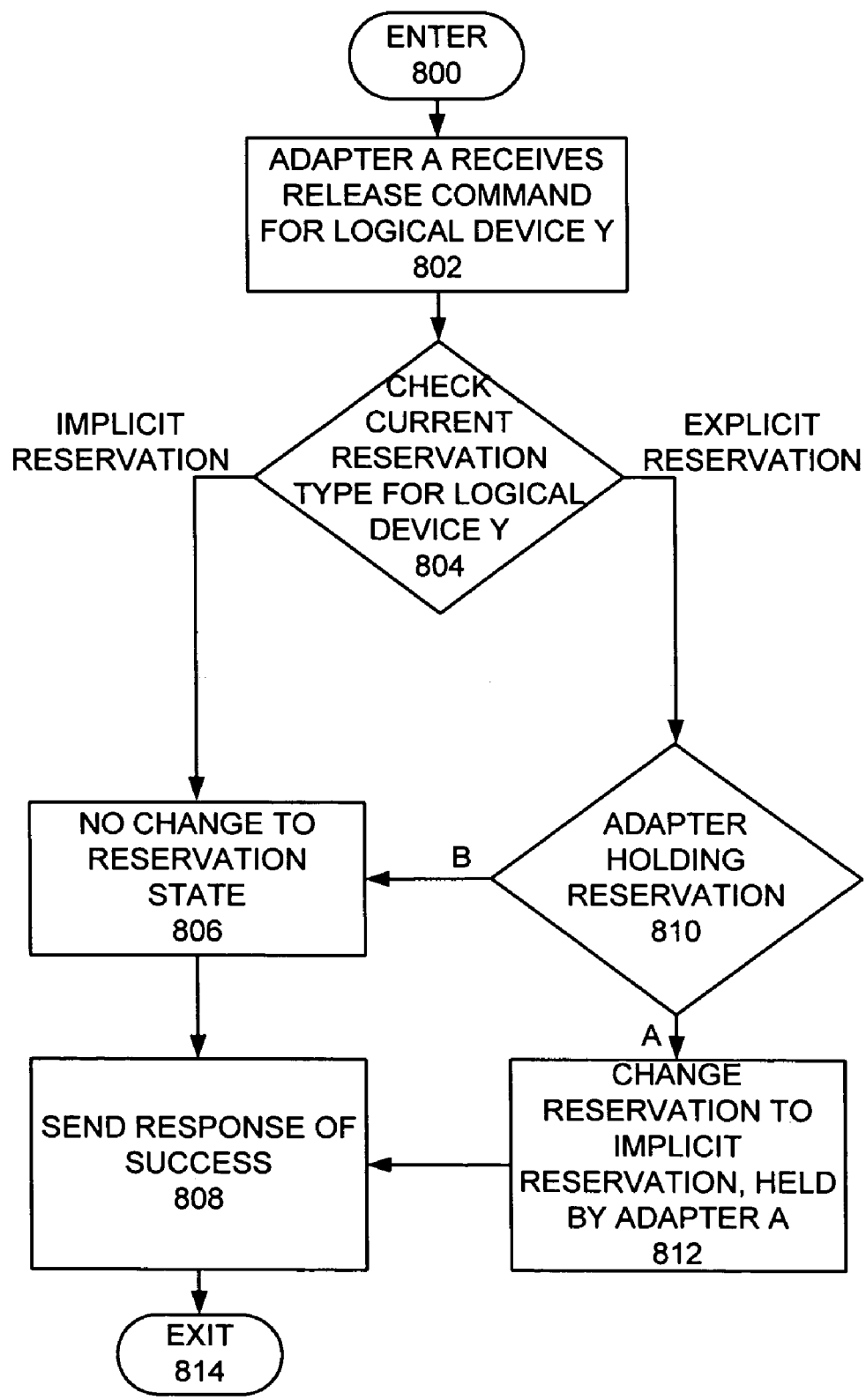

Referring now to FIG. 8, there are shown exemplary steps of a release command flow shown at block 212 of FIG. 2 starting at a block 800. As indicated in a block 802, a release command is received by adapter A for a logical device Y. Checking for a reservation type for logical device Y is performed as indicated in a decision block 804. When an implicit reservation is identified, no change to the reservation state is made as indicated in a block 806 and a response of success is sent as indicated in a block 808. When an explicit reservation is identified, checking whether adapter A or adapter B holds a reservation for logical device Y is performed as indicated in a decision block 810. When adapter B holds the reservation for logical device Y, then no change to the reservation state is made at block 806 and a response of success is sent at block 808. When adapter A holds the reservation for logical device Y, then the reservation is changed to implicit reservation, held by adapter A as indicated in a block 812 and a response of success is sent at block 808. The exemplary steps exit as indicated in a block 814.

Figure 9:
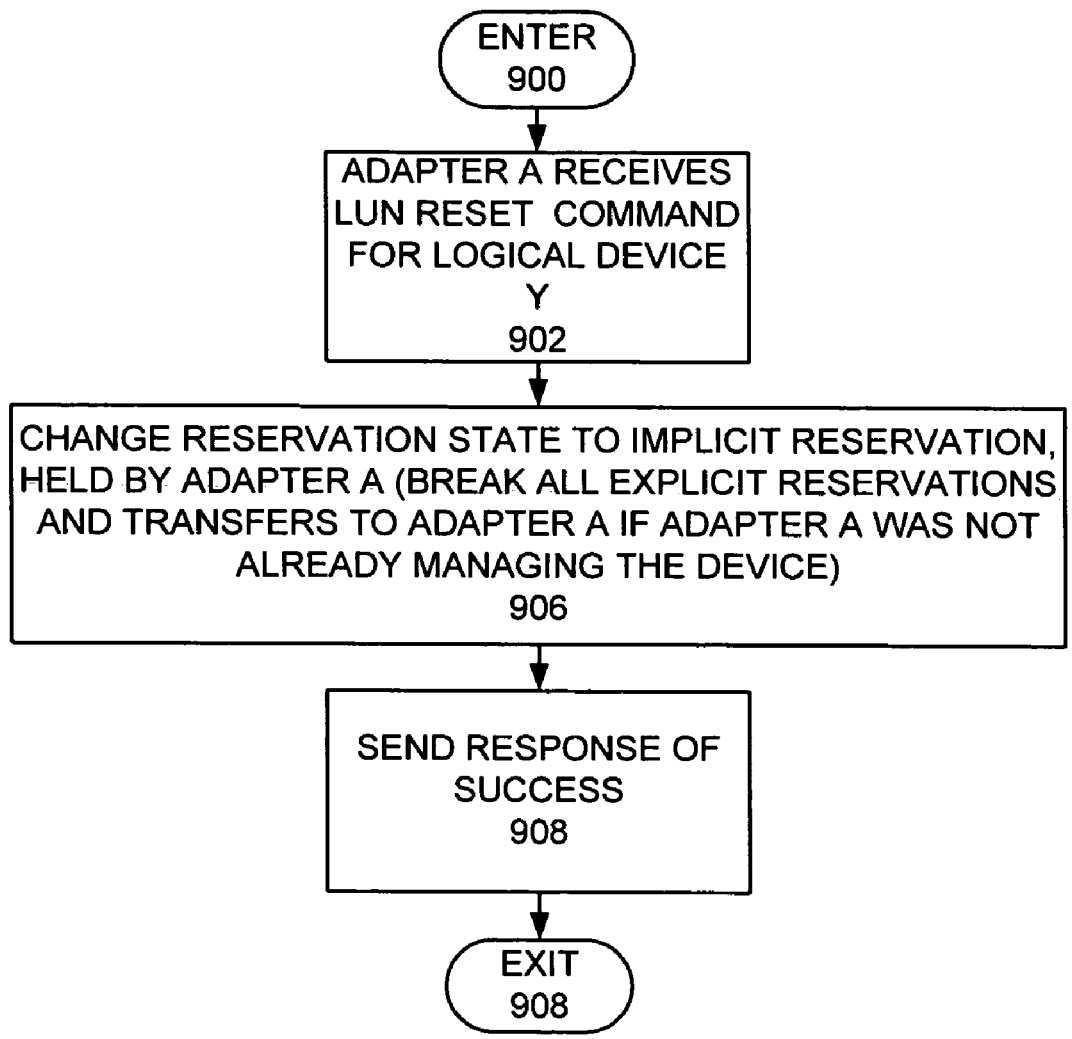
Figure 10:
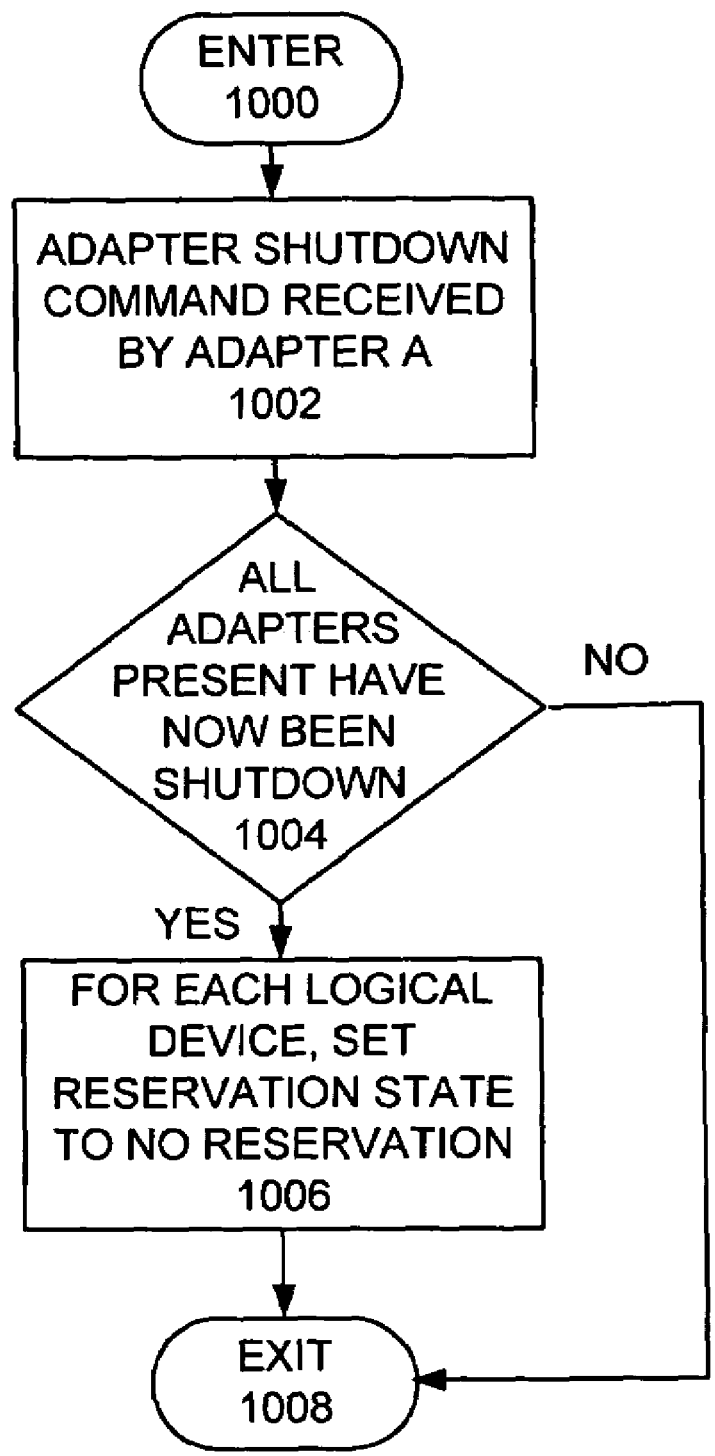

Referring now to FIG. 9, there are shown exemplary steps of a LUN reset command flow shown at block 214 of FIG. 2 starting at a block 900. As indicated in a block 902, a LUN reset command is received by adapter A for a logical device Y. The reservation is changed to implicit reservation, held by adapter A as indicated in a block 904 and a response of success is sent at block 906. The exemplary steps exit as indicated in a block 908.

Referring now to FIG. 10, there are shown exemplary steps of a controlled adapter shutdown flow shown at block 216 of FIG. 2 starting at a block 1000. As indicated in a block 1002, an adapter shutdown command is received by adapter A. Checking whether all adapters present have now been shutdown is performed as indicated in a decision block 1004. If all adapters present have now been shutdown, then for each logical device, the reservation state is set to no reservation as indicated in a block 1006. Then or if not all adapters present have now been shutdown, the exemplary steps exit as indicated in a block 1008.

While the present invention has been described with reference to the details of the embodiments of the invention shown in the drawing, these details are not intended to limit the scope of the invention as claimed in the appended claims.

What is claimed is:

1. A method for implementing distributed small computer systems interface (SCSI) devices using enhanced adapter reservations comprising the steps of:

providing a plurality of adapters; each adapter implementing a plurality of logical devices, each logical device respectively coupled to a port of respective distributed SCSI devices;

said adapters managing reservations for said plurality of logical devices selectively using a no reservation state, an implicit reservation state; and an explicit reservation state; and said adapters assigning one adapter for managing each said plurality of logical devices.

2. The method as recited in claim 1, wherein said adapters arbitrarily assign respective distributed SCSI devices to one of the plurality of adapters in the absence of a host reservation.

3. The method as recited in claim 2, wherein said one of the plurality of adapters is given an implicit reservation to the logical device coupled to the respective distributed SCSI devices.

4. The method as recited in claim 3, wherein other other ones of the plurality of adapters are blocked from using the logical device and operations fail with a reservation conflict response.

5. The method as recited in claim 1, wherein a host device uses predefined SCSI reservation management commands to move respective distributed SCSI devices between the adapters.

6. The method as recited in claim 1, wherein one of the plurality of adapters having an implicit reservation or an explicit reservation to a logical device is responsive to a received reserve command for the logical device, for assigning an explicit reservation to the logical device.

7. The method as recited in claim 6, wherein other ones of the plurality of adapters is responsive to a received reserve command for the logical device, for sending a reservation conflict response and for leaving the reservation state unchanged to the logical device.

8. The method as recited in claim 1, wherein each said adapter having an implicit reservation to a logical device is responsive to a received release command for the logical device, for leaving the reservation state unchanged to the logical device.

9. The method as recited in claim 1, wherein each said adapter having an explicit reservation to a logical device is responsive to a received release command for the logical device, for changing the reservation state to an implicit reservation to the logical device.

10. The method as recited in claim 1, wherein said adapters are responsive to a received (LUN) reset command for the logical device, for changing the reservation state to an implicit reservation to the logical device, and assigning a predefined adapter for managing the logical device.

11. The method as recited in claim 1, wherein said adapters at initial program load (IPL) are responsive to a current reservation state of no reservation for a logical device for maintaining the reservation state of no reservation for the logical device, and assigning a predefined adapter for managing the logical device.

12. The method as recited in claim 11, wherein said adapters at initial program load (IPL) are responsive to a current reservation state of an implicit reservation for a logical device for changing the reservation state to no reservation for the logical device, and assigning a predefined adapter for managing the logical device.

13. The method as recited in claim 11, wherein said adapters at initial program load (IPL) are responsive to a current reservation state of an explicit reservation for a logical device for maintaining the reservation state of explicit reservation for the logical device for a currently present adapter managing the logical device.

14. The method as recited in claim 1, wherein one of the plurality of adapters having an implicit reservation or an explicit reservation to a logical device is responsive to a received open request for the logical device, for leaving the reservation state unchanged to the logical device.

15. The method as recited in claim 14, wherein other ones of the plurality of adapters to a logical device is responsive to a received open request for the logical device, for changing a no reservation state to an implicit reservation to the logical device, and assigning a predefined adapter for managing the logical device.

16. The method as recited in claim 1, wherein one of the plurality of adapters having an implicit reservation or an explicit reservation to a logical device is responsive to a received media command to the logical device, for executing the media command and sending a success response.

17. The method as recited in claim 16, wherein other ones of the plurality of adapters is responsive to a received media command to the logical device, for sending a reservation conflict response.

18. The method as recited in claim 1, wherein said adapters are decoupled and are enabled to independently power up and power down.

19. Apparatus for implementing distributed small computer systems interface (SCSI) devices using enhanced adapter reservations comprising:

a plurality of adapters; each adapter implementing a plurality of logical devices, each logical device respectively coupled to a port of respective distributed SCSI devices;

said adapters managing reservations for said plurality of logical devices selectively using a no reservation state, an implicit reservation state; and an explicit reservation state; and said adapters assigning one adapter for managing each said plurality of logical devices.

* * * * *